No. 783,909. PATENTED FEB. 28, 1905.
H. C. SWAN.
SHAFT CLAMP.
APPLICATION FILED NOV. 19, 1904.
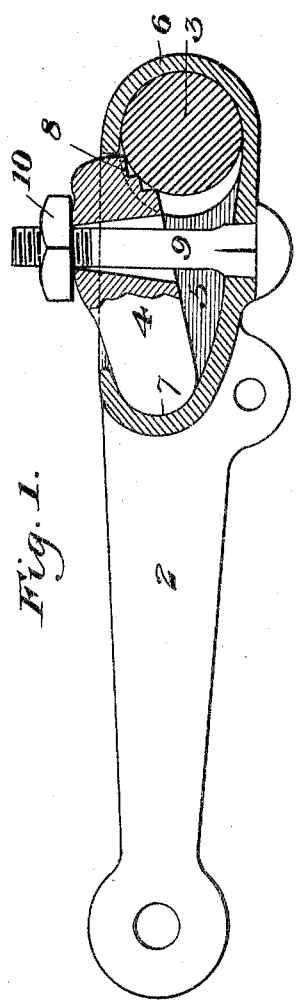
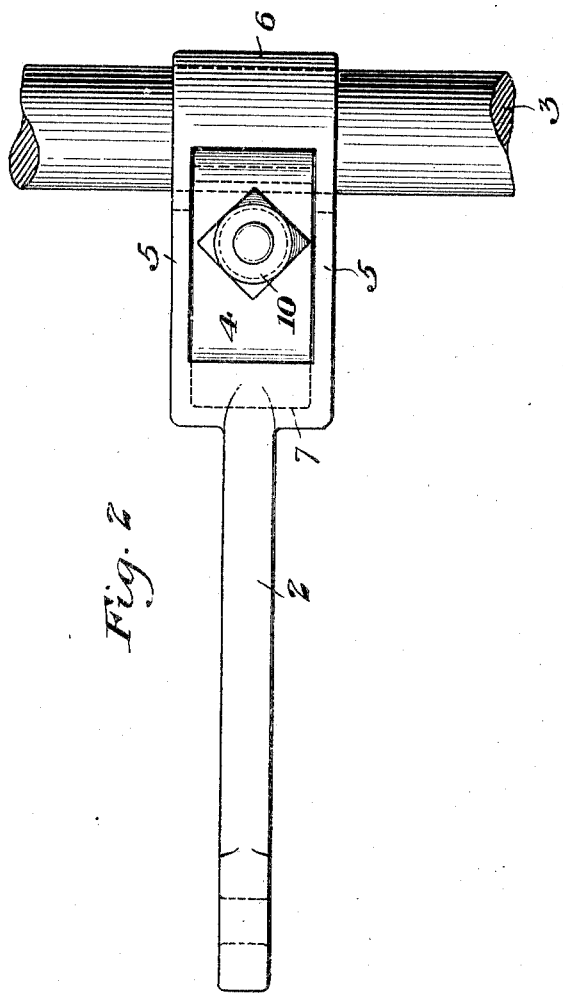
WITNESSES
INVENTOR No. 783,909. Patented February 28, 1905.

UNITED STATES PATENT OFFICE.

HENRY C. SWAN, OF CLEVELAND, OHIO.

SHAFT-CLAMP.

SPECIFICATION forming part of Letters Patent No. 783,909, dated February 28, 1905.

Application filed November 19, 1904. Serial No. 233,425.

*To all whom it may concern:*

Be it known that I, HENRY C. SWAN, of Cleveland, Cuyahoga county, Ohio, have invented a new and useful Shaft-Clamp, of which the following is a full, clear, and exact description, reference being had to the accompanying drawings, forming part of this specification, in which—

Figure 1 is a sectional side elevation of my improved clamp in position, and Fig. 2 is a top plan view of the same.

My invention relates to the devices employed for clamping or securing an arm or lever to a shaft, and more particularly to the type wherein the shaft extends through an oblong hole in the lever and a dog is employed for gripping the shaft and forcing it frictionally into contact with the surrounding socket.

The object of the invention is to provide a new and improved arrangement of the dog and adjusting device whereby it may be quickly and firmly secured and easily detached from the shaft.

In the drawings, 2 represents the lever or crank-arm, 3 the shaft, and 4 the gripping-dog. The shaft 3 extends through a box-like portion at the end of the lever formed by the side pieces or forks 5 5 and the rounded outer wall 6. The holes through the side plates are oblong, and the top of the casing or box portion is cut away to receive the swinging dog. The rear end of this dog is preferably rounded and fits within a pocket 7 in the rear end of the box or casing, so as to tilt in this pocket. The dog is preferably provided with serrated teeth 8 and is adjusted by means of a bolt 9, which extends through a hole in the bottom of the casing and through a flared hole in the dog. The top of the dog is preferably rounded or shaped to provide a proper face for receiving the pressure of the nut 10.

In using the device the shaft is slipped through the oblong holes, the dog is dropped down, and its teeth are then firmly forced against the shaft by turning the nut 10. The shaft is thus forced into firm contact with the inner cylindrical surface of the outer wall and securely clamped.

The advantages of my invention result from the simplicity and ease of the operation of the device and from its efficient clamping action.

The dog is preferably made of steel, while the lever may be made of a malleable casting.

Many changes may be made in the form and arrangement of the parts without departing from my invention.

I claim—

1. In a shaft-clamp, an arm having perforated forks with an outer pocket, a pivoted dog between the forks and having an end portion arranged to grip a cylindrical shaft, and a bolt device arranged to draw the dog to place; substantially as described.

2. In a shaft-clamp, a lever having a hole for the shaft, a dog mounted on the lever and having an end portion arranged to grip a cylindrical shaft, and an adjusting device arranged to force the dog into contact with the shaft; substantially as described.

3. In a shaft-clamp, a lever having an outer casing portion, with a cylindrical outer wall arranged to fit the shaft, a dog pivoted between the sides of the casing and having an end portion arranged to grip a cylindrical shaft, and a screw-bolt extending through the casing and the dog; substantially as described.

4. In a shaft-clamp, a lever having an outer casing or box portion with perforated sides and a cylindrical outer wall, a dog arranged to swing between the sides of the casing and through the top and having an end portion arranged to grip a cylindrical shaft, and a screw-bolt extending through the bottom of the casing and through the dog; substantially as described.

In testimony whereof I have hereunto set my hand.

HENRY C. SWAN.

Witnesses:
 ERICH W. KATH,
 EMIL W. JAITE.